Patented June 23, 1953

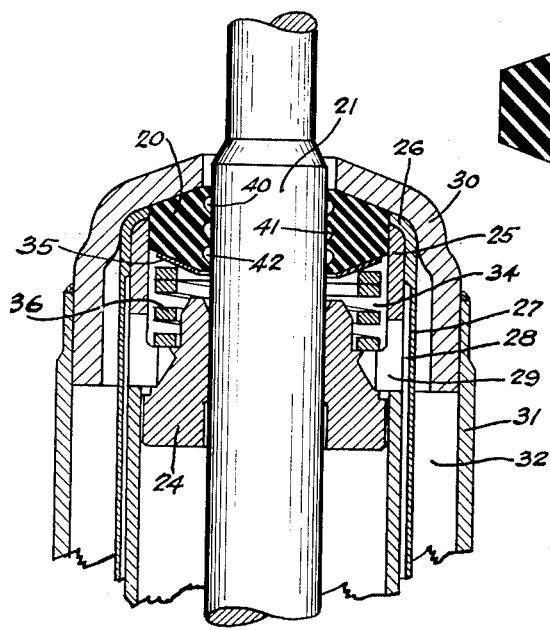

2,643,147

UNITED STATES PATENT OFFICE 2,643,147

PACKING

Mearick Funkhouser and Paul J. Long, Dayton, Ohio, assignors to General Motors Corporation, Detroit, Mich., a corporation of Delaware Application September 1, 1948, Serial No. 47,215

3 Claims. (Cl. 288—19)

This invention relates to improvements in packings adapted to encircle a reciprocative rod.

It is among the objects of the present invention to provide a reciprocative rod with a packing operative substantially to prevent fluid from passing between the packing and rod as said rod is reciprocated in one direction and to allow fluid to pass between the packing and rod as said rod is reciprocated in the opposite direction.

A further object of the present invention is to provide a packing of resilient material such as rubber or synthetic rubber compounded to be of proper hardness and impervious to the fluid with which the packing is used, the packing being ring-shaped and interiorly grooved to cause the packing to provide a seal against fluid leakage as the rod moves in one direction through the packing and as a relay pump passing fluid from groove to groove as the rod is moved in the opposite direction.

A still further object of the present invention is to provide a packing of resilient material for a reciprocative rod, the surface of the packing contiguous to and encircling the rod having alternate grooves and annular surfaces which, when stressed by insertion of the rod into the packing engage the rod in such a manner as to prevent rolling or substantial movement of portions of the packing with the reciprocating rod, thereby appreciably reducing wear and increasing the useful life of the packing.

Further objects and advantages of the present invention will be apparent from the following description, reference being had to the accompanying drawings wherein a preferred embodiment of the present invention is clearly shown.

In the drawings:

Fig. 1 is a part sectional view of a shock absorber equipped with the present invention.

Fig. 2 is an enlarged sectional view of the packing.

Fig. 3 is a fragmentary, extra large sectional view of one side of the packing showing the contour of the grooved interior with the rod removed.

Fig. 4 is a view similar to Fig. 3, showing the contour of the grooved interior when the rod is inserted in the packing.

Referring to the drawings the packing 20 is shown to be ring shaped with its two annular edges chamfered. This packing is particularly adapted for use with reciprocative shaft or rods and therefore it has been shown in Fig. 1 of the drawings to be applied to the piston rod 21 of a direct acting hydraulic shock absorber. The rod 21 has a piston 22 attached thereto which reciprocates in the cylinder 23. A head member 24 is provided at one end of cylinder 23, said head member having a central opening in which rod 21 is slidably supported. The head member 24 has an annular extension 25 upon the outer peripheral edge of which rests the inwardly extending flange 26 of the tubular baffle 27 which surrounds the cylinder 23 for a portion of its length so as to form an annular space 28 around the cylinder. The annular extension 25 of the head member 24 has opening 29 therein, providing communication between the interior of the annular extension 25 and the annular space 28.

A cover cap 30 fits into the tubular member 31 and is secured thereto to form an annular chamber 32 or fluid reservoir about the cylinder 23. Before being attached to tube 31, the cover cap is forced down upon the flange 26 of tube 27 which urges the entire cylinder assembly upon the bottom closure member 33 secured to the end of tube 31 opposite cap 30. Cap 30 has a central opening through which the piston rod 21 extends.

The packing 20 is located within the chamber 34 defined by the cover cap 30, the head member 24 and its annular extension 25. Being ring shaped it embraces the portion of rod 21 extending through said chamber. The one chamfered edge of the packing fits upon the interior of the cover cap 30, the other chamfered edge having the pressure ring 35 engaging it, which ring is in turn engaged by one end of spring 36, the other end of said spring seating upon the head member 24. Spring 36 biases the resilient packing 20 into sealing engagement with the interior of the cover cap 30, the inner edge of the flange 26 of tube 27 and a portion of the annular wall of the extension 25. The packing is made of any suitable resilient material such as rubber, synthetic rubber compounded so as to be impervious to oils or liquids used in the device equipped with the packing.

The annular surface of the opening in the ring-shaped packing has alternate annular grooves and annular areas, the latter engaging the rod when it is inserted in the packing. It has been found that certain types of such grooves, for instance grooves semi-circular in cross-sectional shape or wedge-shaped in cross-section, will scrape adhering fluid from the contained rod to prevent it leaking past the packing, however, such packings will wear prematurely and permit undesirable leaks inasmuch as they will permit the raking edges of the grooves to be moved by the reciprocating rod causing excessive wear. The grooves and intermediate rod contacting areas of the present packing are designed to eliminate rolling with the rod thereby reducing wear to a minimum. The packing of the present invention is designed substantially to scrape off the fluid adhering to the rod as it moves from the fluid containing chamber, through the packing toward the exterior thereof and to permit fluid transfer from groove to groove and finally back into the fluid containing chamber as the rod moves through the packing in the opposite direction. The raking angle of the one rod contacting edge of the annular area encircling the rod is such that although it grips the rod with sufficient pressure to scrape off substantially all fluid clinging to said rod as it moves through the packing in one direction, yet movement of said edge with the rod is eliminated and therefore the useful life of the packing is appreciably lengthened. The other portion of the rod encircling area does not grip the rod so tightly therefore as the rod is moved through the packing in the opposite direction, any fluid in any groove will be transferred to the next adjacent groove in the direction of rod movement or more particularly toward the fluid containing chamber into which the rod is now moving. Thus this packing acts to prevent fluid passage therethrough in one direction and to allow fluid passage therethrough in the opposite direction.

The preferred shapes of these alternate grooves and rod gripping areas are clearly illustrated in the Figs. 2, 3 and 4. Fig. 2 shows the complete packing in cross-section and Fig. 3 shows one portion thereof in enlarged section. Both Figs. 2 and 3 show the packing unstressed that is, without the rod therein. Fig. 4 is similar to Fig. 3, but shows the packing section stressed by the presence of the rod therein. The spaced, annular grooves 40, 41 and 42 are substantially semi-cardioidal in cross-sectional shape including the circular wall 47, the sloping wall 48 and the short tangential wall 49.

The intermediate rod gripping areas of the packing, numbered 44, 45 and 46 are conoidal in shape, that is, these areas each taper, the larger diameter, annular edge of each, which edge meets the sloping wall 48 of the adjacent groove being slightly less in diameter than the rod 21 to reciprocate in the packing. The other, smaller diameter, annular edge of each rod gripping area, which edge meets the tangential wall 49 of a groove, is predeterminately less in diameter, when not stressed as in Fig. 3, than the diameter of the rod. In a long wearing, well functioning packing the tapering, rod engaging areas 44, 45 and 46, are when unstressed, approximately 90° to the adjacent tangential wall 49 of a groove and approximately 10% to the axial center of the bearing. When stressed, these areas completely grip the rod as shown in Fig. 4. Under the stressed condition the tangential wall 49 is shortened by compression of the packing said wall however, being at approximately 90° with the rod surface. Thus the annular portion of the packing adjacent the point of meeting between the wall 49 and the rod engaging area, grips said rod at a greater pressure than the portion of the packing where the sloping wall 48 of a groove meets the surface of the rod. The area 43 however, does not taper as do the areas 44, 45 and 46, so that this area 43 encircles the rod at a pressure substantially equal to the encircling pressure of the annular portion adjacent the point of meeting between a wall 49 and the rod engaging area of the packing. Thus this portion of the packing sealingly engages the rod to prevent fluid leaks between the packing and rod in either direction as the rod reciprocates. This particular construction of the packing grooves and rod gripping areas substantially prevents the leading rod engaging edges of the packing to roll with the rod as the rod is moved in a direction from the fluid containing chamber beneath the cylinder head in Fig. 1 toward the exterior of the packing, thereby substantially reducing wear and increasing useful life of the packing. These leading edges of the rod engaging areas 44, 45 and 46 will scrape practically all adhering fluid from the rod. Any fluid that passes by said edges will be retained in the grooves 40, 41 and 42 as the rod moves in this upward direction out of the fluid containing chamber.

As the rod moves in the opposite direction, however, the packing acts as a pump, passing the fluid gathered in one groove to the next lower groove and eventually into the fluid containing chamber. This also lubricates the packing areas engaging the rod. This pumping action is effected because of the comparatively lighter gripping pressure upon the rod by the areas adjacent the meeting of the sloping wall 48 of each groove with the said rod engaging areas. The relatively light gripping pressures of the upper portion of the rod contacting areas 44, 45 and 46 permit the downwardly moving rod to draw the fluid in a groove with said rod and force it through the area into the next lower groove.

From the aforegoing it may be seen that the present invention provides a packing for a reciprocating rod or shaft which practically eliminates fluid leakage between the packing and encircled rod as said rod moves in one direction and provides for the transfer of fluid between said packing and rod as said rod moves in the opposite direction, the construction of the packing also reducing wear due to friction, thereby providing a packing operative effectively over a long period of use.

While the embodiment of the present invention as herein disclosed, constitutes a preferred form, it is to be understood that other forms might be adopted.

What is claimed is as follows:

1. A packing adapted to fit about a reciprocative rod to prevent movement of liquid axially of the rod in one direction of reciprocative movement and permit flow of liquid axially of the rod in the reverse reciprocative movement thereof, said packing consisting of a ring-shaped body of resilient material, the inner, peripheral surface of which has a plurality of alternate, annular grooves and annular rod contacting areas, each of corresponding areas having corresponding edges of substantially the same diameter as a rod to be received and other corresponding edges of predetermined lesser diameter than the first-mentioned edges with the rod contacting areas between said edges sloping continuously outwardly relative to the axis of the packing at an angle of approximately 10 degrees relative to the axis of the packing, the surface of the grooves meeting the smaller diameter edge portions of said areas at substantially 90 degrees relatively to said rod engaging areas and the surface of the grooves meeting the larger diameter edges of said areas at a relatively wide obtuse angle substantially greater than a right angle, said areas each forming thereby an annular surface on an annular inwardly directed projection on said body with said body extending solidly radially outwardly of said areas along the full axial length of said areas.

2. A packing adapted to fit about a reciprocative rod to prevent movement of liquid axially of the rod in one direction of reciprocative movement and permit flow of liquid axially of the rod in the reverse reciprocative movement thereof, said packing consisting of a ring-shaped body of resilient material, the inner, peripheral surface of which has a plurality of alternate, annular grooves and annular rod contacting areas, the one, outermost rod contacting area being of axially uniform substantially like diameter as a rod to be received by the packing, the remaining rod contacting areas sloping continuously outwardly at an angle of approximately 10 degrees relative to the axis of the packing, each of corresponding areas having corresponding edges, the edges more adjacent the said outermost area being at most no larger in diameter than the rod to be received and the edges of the areas more remote from said outermost area being of predetermined lesser diameter, the grooves each having a surface portion meeting the rod contacting area at its smaller diameter edge at substantially 90 degrees and another surface portion meeting the rod contacting area at its larger diameter edge at a relatively wide obtuse angle substantially greater than a right angle, said areas each forming thereby an annular surface on an annular inwardly directed projection on said body with said body extending solidly radially outwardly of said areas along the full axial length of said areas, whereby, when the rod is placed in the packing the dilated, smaller diameter edge portions of the rod engaging areas will substantially seal the rod against fluid leaks as the rod moves in one direction through the packing and the lesser diameter edge portion of the rod engaging areas will permit fluid to enter between the rod and packing and be drawn through the packing as the rod moves through said packing in the opposite direction.

3. A packing adapted to fit about a reciprocative rod to prevent movement of liquid axially of the rod in one direction of reciprocative movement and permit flow of liquid axially of the rod in the reverse reciprocative movement thereof, said packing consisting of a ring-shaped body of resilient material, the inner, peripheral surface of which has a plurality of annular grooves, semi-cardioidal in cross-sectional shape and substantially wide annular rod engaging areas one of which is parallel to the axis of the packing and of axially uniform substantially like diameter as a rod to be received, the other areas sloping continuously outwardly at an angle of approximately 10 degrees relative to the axis of the packing, the edges of the respective areas more adjacent the said one area being at most no larger in diameter than the rod to be received, the other edges of said areas being predeterminately smaller in diameter than the first-mentioned areas, the one, rounded surface of each semi-cardioidal groove meeting the smaller diameter edge of the adjacent rod engaging area at substantially right angle thereto and the sloping, substantially straight surface portion of the groove meeting the larger diameter edge of the other adjacent rod engaging area at a relatively wide obtuse angle, substantially greater than a right angle, said areas each forming thereby an annular surface on an annular inwardly directed projection on said body with said body extending solidly radially outwardly of said areas along the full axial length of said areas, whereby the encompassed rod is gripped progressively looser from the smaller diameter edge portion of the rod engaging area to the larger diameter edge portion thereof.

MEARICK FUNKHOUSER.
PAUL J. LONG.

References Cited in the file of this patent

UNITED STATES PATENTS

| Number | Name | Date |
|---|---|---|
| Re. 20,497 | Johnson | Sept. 7, 1937 |
| 2,182,034 | Oberstadt | Dec. 5, 1939 |
| 2,295,683 | Osmun | Sept. 15, 1942 |
| 2,368,137 | Harmon | Jan. 30, 1945 |
| 2,401,539 | Benson | June 4, 1946 |

FOREIGN PATENTS

| Number | Country | Date |
|---|---|---|
| 6,919 | Great Britain | of 1891 |